United States Patent
Kuno

(10) Patent No.: US 8,810,851 B2
(45) Date of Patent: Aug. 19, 2014

(54) IMAGE PROCESSING APPARATUS CORRECTING PRINT DATA BY REDUCING THE SIZE OF DOT DATA IN EDGE REGIONS

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 35 days.

(21) Appl. No.: 13/354,095

(22) Filed: Jan. 19, 2012

(65) Prior Publication Data
US 2012/0188561 A1   Jul. 26, 2012

(30) Foreign Application Priority Data
Jan. 21, 2011 (JP) .................................. 2011-011290

(51) Int. Cl.
*G06K 15/02* (2006.01)

(52) U.S. Cl.
USPC ............. 358/1.2; 358/1.8; 358/1.9; 358/3.06; 347/14; 347/9; 347/5; 347/15; 347/43; 347/20; 347/16; 347/19

(58) Field of Classification Search
USPC ................. 358/1.2, 1.8, 1.9, 3.06; 347/15
See application file for complete search history.

(56) References Cited

U.S. PATENT DOCUMENTS

| | | | |
|---|---|---|---|
| 5,436,736 A | 7/1995 | Shono | |
| 5,506,698 A | 4/1996 | Nishihara | |
| 5,530,561 A | 6/1996 | Shimazaki | |
| 5,610,999 A | 3/1997 | Bannai et al. | |
| 5,809,177 A | 9/1998 | Metcalfe et al. | |
| 6,089,691 A | 7/2000 | Kakutani | |
| 6,099,105 A | 8/2000 | Kakutani | |
| 6,149,327 A * | 11/2000 | Ward et al. ................... | 400/582 |
| 6,764,162 B2 | 7/2004 | Biddle et al. | |
| 7,651,206 B2 | 1/2010 | Hawkins et al. | |
| 8,353,569 B2 * | 1/2013 | Takahashi et al. .............. | 347/14 |

(Continued)

FOREIGN PATENT DOCUMENTS

| | | |
|---|---|---|
| JP | H07-093534 A | 4/1995 |
| JP | H11-188898 A | 7/1999 |

(Continued)

OTHER PUBLICATIONS

Japan Patent Office, Office Action for Japanese Patent Application No. 2011-011290 (counterpart Japanese patent application), mailed Feb. 5, 2013.

(Continued)

*Primary Examiner* — Paul F Payer
(74) *Attorney, Agent, or Firm* — Baker Botts L.L.P.

(57) ABSTRACT

In an image processing apparatus, the generating unit generates print data indicating whether a dot having one of a plurality of sizes is formed or not, by performing a halftone process on original image data. The correcting unit generates corrected print data by correcting the print data. The dividing unit divides the edge part data of the print data into a plurality of block data. The index value determining unit determines, for each block data, an index value relating to an amount of ink to be used based on the plurality of dot data included in the each block data. The changing unit changes, for each block data, the size information of at least one dot data among the plurality of dot data included in the each block data based on the index value such that the amount of ink to be used becomes reduced.

11 Claims, 10 Drawing Sheets

(56) References Cited

U.S. PATENT DOCUMENTS

| | | |
|---|---|---|
| 2002/0051023 A1 | 5/2002 | Teshigawara et al. |
| 2002/0080377 A1 | 6/2002 | Tonami et al. |
| 2003/0043219 A1 | 3/2003 | Kojima |
| 2003/0169320 A1 | 9/2003 | Tomotake et al. |
| 2004/0174566 A1 | 9/2004 | Akahori |
| 2006/0023011 A1 | 2/2006 | Hawkins et al. |
| 2006/0098232 A1 | 5/2006 | Nakano et al. |
| 2006/0103688 A1* | 5/2006 | Hirano ............ 347/15 |
| 2006/0125852 A1* | 6/2006 | Yamakado ......... 347/5 |
| 2006/0164492 A1 | 7/2006 | Brookmire et al. |
| 2008/0094436 A1 | 4/2008 | Kakutani et al. |
| 2008/0094651 A1* | 4/2008 | Takahashi ......... 358/1.13 |
| 2008/0144059 A1 | 6/2008 | Nagai |
| 2010/0156979 A1 | 6/2010 | Takahashi et al. |
| 2010/0165032 A1* | 7/2010 | Yoshida ............ 347/15 |
| 2012/0062908 A1 | 3/2012 | Kuno |
| 2012/0188609 A1 | 7/2012 | Kuno |

FOREIGN PATENT DOCUMENTS

| | | |
|---|---|---|
| JP | 2002-200745 A | 7/2002 |
| JP | 2003-062984 A | 3/2003 |
| JP | 2003-237062 A | 8/2003 |
| JP | 4154899 B2 | 8/2003 |
| JP | 2003-300312 A | 10/2003 |
| JP | 2003-326747 A | 11/2003 |
| JP | 2006-082266 A | 3/2006 |
| JP | 2007-088927 A | 4/2007 |
| JP | 2007-118380 A | 5/2007 |
| JP | 2010-162882 A | 7/2010 |
| JP | 2011-000716 A | 1/2011 |
| WO | 98/03341 A1 | 1/1998 |

OTHER PUBLICATIONS

Japan Patent Office, Office Action for Japanese Patent Application No. 2011-011291 (counterpart Japanese patent application), mailed Feb. 5, 2013.

Japan Patent Office, Office Action for Japanese Patent Application No. 2011-011291 (counterpart to above-captioned patent application), mailed May 7, 2013.

United States Patent and Trademark Office, Final Rejection for U.S. Appl. No. 13/354,173 (related to above-captioned patent application), mailed Feb. 20, 2014.

* cited by examiner

FIG. 6A

NUMBER OF DOTS FOR EACH COLOR

|   | LARGE | MEDIUM | SMALL |
|---|---|---|---|
| C | 15 | 2 | 3 |
| M | 9 | 2 | 3 |
| Y | 4 | 4 | 0 |
| K | 1 | 3 | 3 |

|   | 16pl LARGE | 5pl MEDIUM | 3pl SMALL | INK AMOUNT TO BE USED | TARGET INK AMOUNT | TARGET REDUCTION |
|---|---|---|---|---|---|---|
| C | 240 | 10 | 9 | 259 | 223.3 | 35.7 |
| M | 144 | 10 | 9 | 163 | 140.5 | 22.5 |
| Y | 64 | 20 | 0 | 84 | 72.4 | 11.6 |
| K | 16 | 15 | 9 | 40 | 40.0 | 0.0 |

CMYK TOTAL INK AMOUNT: 546
INK AMOUNT PER PIXEL: 27.3
RATIO: 0.862

NUMBER OF DOTS AFTER REDUCTION

|   | LARGE | MEDIUM | SMALL | INK AMOUNT TO BE USED |
|---|---|---|---|---|
| C | 12 | 4 | 4 | 224 |
| M | 7 | 4 | 3 | 141 |
| Y | 3 | 5 | 0 | 73 |
| K | 1 | 3 | 3 | 40 |

CMYK TOTAL INK AMOUNT AFTER REDUCTION: 478
INK AMOUNT PER PIXEL AFTER REDUCTION: 23.9

FIG. 6B

NUMBER OF DOTS FOR EACH COLOR

|   | LARGE | MEDIUM | SMALL |
|---|---|---|---|
| C | 15 | 2 | 3 |
| M | 9 | 2 | 3 |
| Y | 4 | 4 | 0 |
| K | 1 | 3 | 3 |

|   | 16pl LARGE | 5pl MEDIUM | 3pl SMALL | INK AMOUNT TO BE USED | TARGET INK AMOUNT | TARGET REDUCTION |
|---|---|---|---|---|---|---|
| C | 240 | 10 | 9 | 259 | 220.4 | 38.6 |
| M | 144 | 10 | 9 | 163 | 138.7 | 24.3 |
| Y | 64 | 20 | 0 | 84 | 71.5 | 12.5 |
| K | 16 | 15 | 9 | 40 | 40.0 | 0.0 |

CMYK TOTAL INK AMOUNT: 546
INK AMOUNT PER PIXEL: 27.3
CMY TOTAL INK AMOUNT: 506
CMYK TOTAL RESTRICTION VALUE: 470.7
CMY TOTAL RESTRICTION VALUE: 430.7
RATIO: 0.851

NUMBER OF DOTS AFTER REDUCTION

|   | LARGE | MEDIUM | SMALL | INK AMOUNT TO BE USED |
|---|---|---|---|---|
| C | 12 | 3 | 5 | 222 |
| M | 7 | 3 | 4 | 139 |
| Y | 3 | 5 | 0 | 73 |
| K | 1 | 3 | 3 | 40 |

CMYK TOTAL INK AMOUNT AFTER REDUCTION: 474
INK AMOUNT PER PIXEL AFTER REDUCTION: 23.7

FIG. 6C

NUMBER OF DOTS FOR EACH COLOR

|   | LARGE | MEDIUM | SMALL |
|---|---|---|---|
| C | 15 | 2 | 3 |
| M | 9 | 2 | 3 |
| Y | 4 | 4 | 0 |
| K | 1 | 3 | 3 |

16pl  5pl  3pl

|   | LARGE | MEDIUM | SMALL | INK AMOUNT TO BE USED | TARGET INK AMOUNT | TARGET REDUCTION |
|---|---|---|---|---|---|---|
| C | 240 | 10 | 9 | 259 | 223.3 | 35.7 |
| M | 144 | 10 | 9 | 163 | 140.5 | 22.5 |
| Y | 64 | 20 | 0 | 84 | 72.4 | 11.6 |
| K | 16 | 15 | 9 | 40 | 34.5 | 5.5 |

| CMYK TOTAL INK AMOUNT | 546 | CMYK TOTAL INK AMOUNT AFTER REDUCTION |
| INK AMOUNT PER PIXEL | 27.3 | INK AMOUNT PER PIXEL AFTER REDUCTION |
| RATIO | 0.862 | |

NUMBER OF DOTS AFTER REDUCTION

|   | LARGE | MEDIUM | SMALL | INK AMOUNT TO BE USED |
|---|---|---|---|---|
| C | 12 | 4 | 4 | 224 |
| M | 7 | 4 | 3 | 141 |
| Y | 3 | 5 | 0 | 73 |
| K | 1 | 1 | 5 | 36 |

| | 474 |
| | 23.7 |

IMAGE PROCESSING APPARATUS CORRECTING PRINT DATA BY REDUCING THE SIZE OF DOT DATA IN EDGE REGIONS

CROSS REFERENCE TO RELATED APPLICATION

This application claims priority from Japanese Patent Application No. 2011-011290 filed Jan. 21, 2011. The entire content of the priority application is incorporated herein by reference.

TECHNICAL FIELD

The invention relates to an image process technique for generating print data.

BACKGROUND

There is conventionally known an ink jet type printer that scans a print head having a nozzle array for ejecting ink droplets in the main scanning direction perpendicular to the nozzle array and, at the same time, ejects ink droplets from the nozzle array onto a paper sheet, thereby printing an image onto the paper sheet.

A printer of such a type can print an image corresponding to a band-like print area (band) that is a unit area for printing and has the same width as the nozzle width (length of the nozzle array) in a single main scan of the print head. To print an image onto an area wider than a single band (e.g., a sheet of paper), band-by-band image print operation is repeated while the position of a paper sheet is shifted in the sub-scanning direction.

The number of gradations that can be expressed by ink droplets ejected from the print head is smaller than the number (e.g., 256 gradations) of gradations of an original image data corresponding to an image to be printed. Thus, ejection of the ink droplets by the print head is performed based on print data with a small number of gradations generated by halftone process.

There exists a problem with the image printed in such a printer that a high-density streak can be generated at the joint between adjacent two bands printed through different main scans. In order to cope with this problem, there has been proposed a technique in which the number of dots is counted for each unit area corresponding to several rasters around the joint in the print data after digitization and pixels are reduced in accordance with the dot count value.

SUMMARY

There has been a demand that the streak that can be generated in the joint between the two unit print areas (bands) printed through different main scans is reduced using another technique.

An object of the invention is to provide another technique for reducing the streak that can be generated in the joint between the two unit print areas (bands) printed through different main scans.

In order to attain the above and other objects, the invention provides an image processing apparatus. The image processing apparatus includes a processor that is configured to function as a generating unit, a correcting unit, and a supplying unit. The generating unit is configured to generate print data indicating whether a dot having one of a plurality of sizes is formed or not, by performing a halftone process on original image data. The print data includes part data corresponding to a unit region on a recording sheet. The unit region is to be printed while one main scanning in which a print head moves in a main scanning direction. The part data includes edge part data corresponding to an edge region of the unit region. The correcting unit is configured to generate corrected print data by correcting the print data. The correcting unit includes a dividing unit, an index value determining unit, and a changing unit. The dividing unit is configured to divide the edge part data into a plurality of block data. Each block data including a plurality of dot data corresponding to a plurality of dots to be printed on the recording medium. The plurality of dots is arranging in the main scanning direction. Each dot data includes size information indicating one of the plurality of sizes. The index value determining unit is configured to determine, for each block data, an index value relating to an amount of ink to be used based on the plurality of dot data included in the each block data. The changing unit is configured to change, for each block data, the size information of at least one dot data among the plurality of dot data included in the each block data based on the index value such that the amount of ink to be used becomes reduced. The supplying unit is configured to supply the corrected print data.

According to another aspect, the present invention provides a non-transitory computer readable storage medium storing a set of program instructions installed on and executed by a computer. The program instructions includes: (a) generating print data indicating whether a dot having one of a plurality of sizes is formed or not, by performing a halftone process on original image data, where the print data includes part data corresponding to a unit region on a recording sheet, where the unit region is to be printed while one main scanning in which a print head moves in a main scanning direction, and where the part data including edge part data corresponds to an edge region of the unit region; (b) generating corrected print data by correcting the print data, where the generating instruction (b) includes: (b1) dividing the edge part data into a plurality of block data, where each block data includes a plurality of dot data corresponding to a plurality of dots to be printed on the recording medium, where the plurality of dots is arranging in the main scanning direction, and where each dot data including size information indicates one of the plurality of sizes; (b2) determining, for each block data, an index value relating to an amount of ink to be used based on the plurality of dot data included in the each block data; and (b3) changing, for each block data, the size information of at least one dot data among the plurality of dot data included in the each block data based on the index value such that the amount of ink to be used becomes reduced; and (c) supplying the corrected print data.

BRIEF DESCRIPTION OF THE DRAWINGS

In the drawings:

FIG. 6A is an explanatory diagram illustrating an ink amount adjustment process according to a first embodiment;

FIG. 6B is an explanatory diagram illustrating an ink amount adjustment process according to a second embodiment;

FIG. 6C is an explanatory diagram illustrating an ink amount adjustment process according to a third embodiment;

DETAILED DESCRIPTION

<1. First Embodiment>
<1-1. Configuration>

Figure 1:
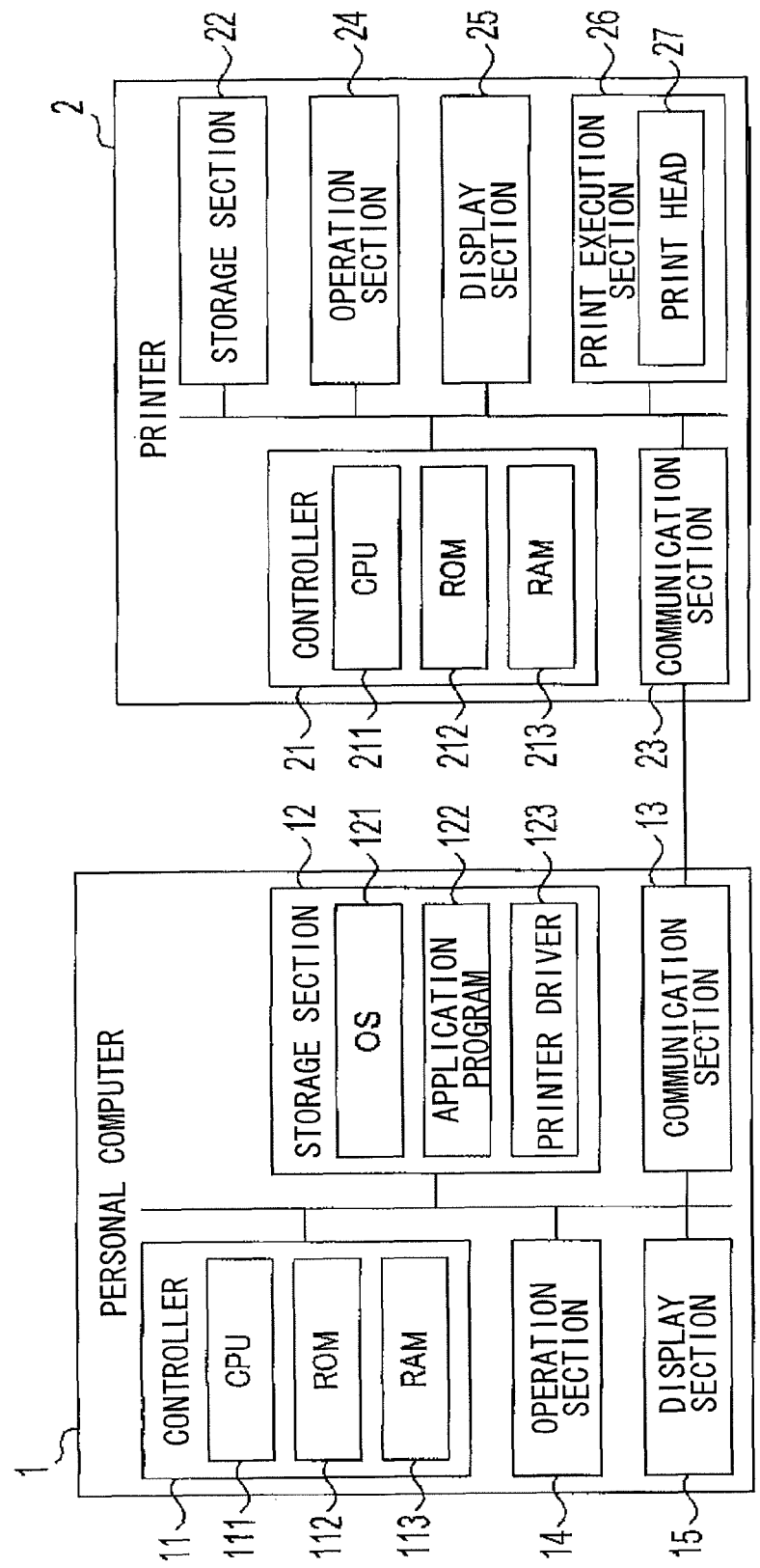
FIG. 1 is a block diagram schematically illustrating a configuration of a print system according to a first embodiment.

FIG. 1 is a block diagram schematically illustrating a configuration of a print system according to a first embodiment. The print system includes a personal computer 1 and a printer 2 configured to be able to perform data communication with each other.

The personal computer 1 is a general-purpose information processor and includes a controller 11, a storage section 12, a communication section 13, an operation section 14, and a display section 15.

The controller 11 overall-controls respective components of the personal computer 1 and includes a CPU 111, a ROM 112, and a RAM 113. The storage section 12 is a non-volatile storage device that can rewrite its stored data. In the first embodiment, a hard disk drive is used as the storage section 12. An operating system (OS) 121, an application program 122 such as a graphic tool, and a printer driver 123 which is software (program) for allowing the personal computer 1 to utilize the printer 2 are installed in the storage section 12. The communication section 13 is an interface for performing data communication with the printer 2. The operation section 14 is an input device for a user to input a command. In the first embodiment, a keyboard or a pointing device (mouse, touchpad, etc.) is used as the operation section 14. The display section 15 is an output device for displaying various infounation as a user-viewable image. In the embodiment, a liquid crystal display is used as the display section 15.

The printer 2 is an ink-jet type printer and includes a controller 21, a storage section 22, a communication section 23, an operation section 24, a display section 25, and a print execution section 26.

The controller 21 overall-controls respective components of the printer 2 and includes a CPU 211, a ROM 212, and a RAM 213. The storage section 22 is a non-volatile storage device that can rewrite its stored data. In the embodiment, a flash memory is used as the storage section 22. The communication section 23 is an interface for performing data communication with the personal computer 1. The operation section 24 is an input device for a user to input a command and is provided with various operation buttons. The display section 25 is an output device for displaying various information as a user-viewable image. A small liquid crystal display is used as the display section 25.

Figure 2A:
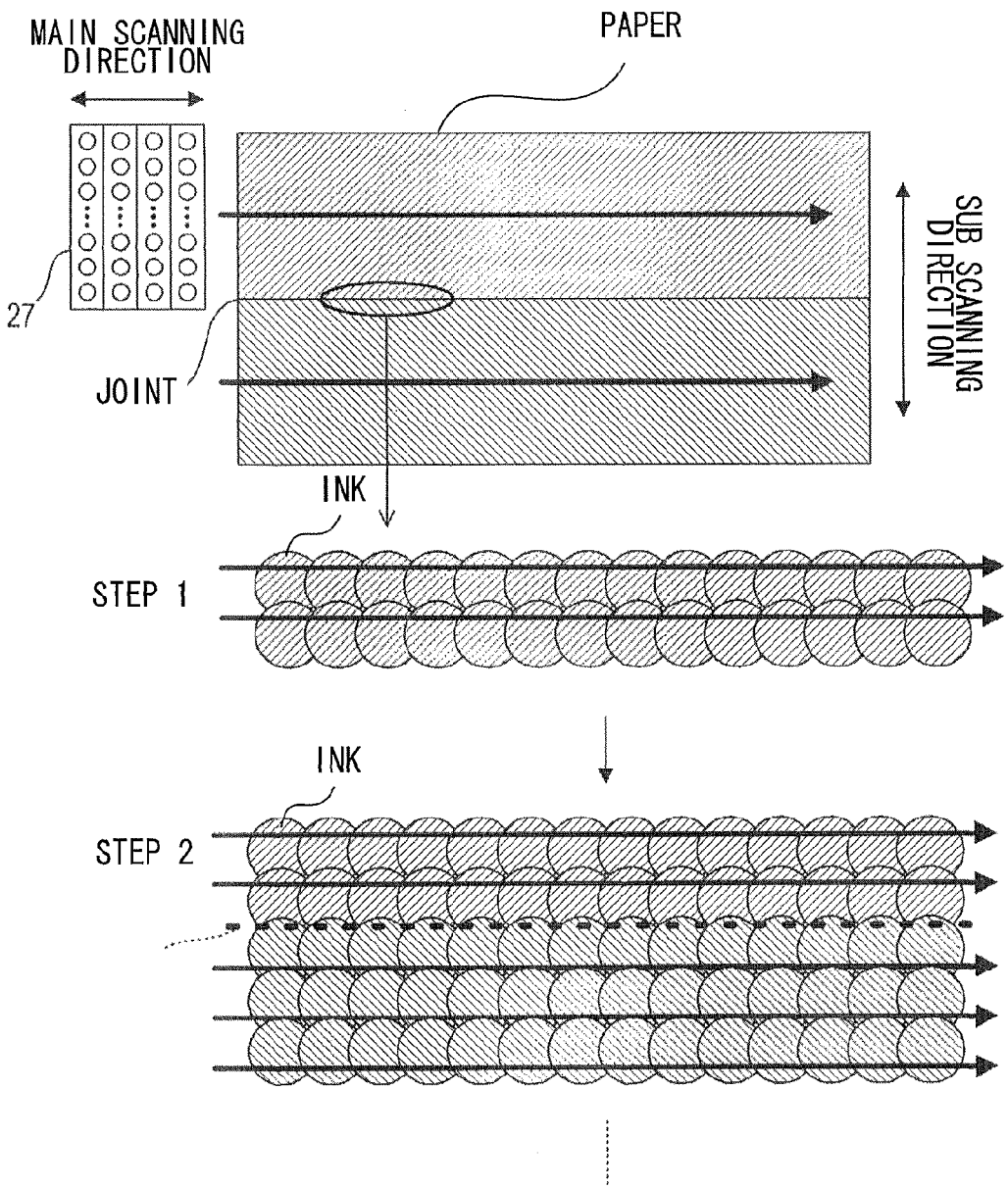
FIG. 2A is an explanatory diagram illustrating streak generated by one pass printing.

The print execution section 26 includes a print head 27 that can reciprocate in the direction (main scanning direction) perpendicular to the conveyance direction (sub-scanning direction) of a paper sheet as a print medium and prints an image onto the paper sheet by ejecting ink droplets based on print data during reciprocation of the print head 27. Nozzles for ejecting ink droplets of respective colors of cyan (C), magenta (M), yellow (Y), and black (K) are arranged in an array on the lower surface (surface facing the paper sheet) of the print head 27 along the sub-scanning direction, and four nozzle arrays are formed as a whole (refer to FIG. 2A, here though in FIG. 2A the print head 27 is viewed from the opposite side to a surface on which the nozzle arrays are formed and thus the nozzle arrays cannot be viewed actually in this state, FIG. 2A shows the nozzle arrays for explaining the position of the ink dropped from the nozzle arrays).

In the printer 2 according to the embodiment, dye inks are used for C, M, and Y, respectively, and a pigment ink is used for K. The dye ink easily permeates into fibers of the paper sheet. The pigment ink is hard to permeate into the inside of the paper sheet but fixed to the paper surface, and thus the pigment ink is poor in fixing performance to a gloss paper sheet while superior in sharpness of characters with respect to a regular paper sheet.

The print execution section 26 performs ink droplet control based on print data in which each pixel constituting an image is expressed by four gradation levels in order to express shading more naturally. In the embodiment, adjusting the ink droplet ejection amount in a plurality of levels allows four gradation levels of large dot, medium dot, small dot, and no dot to be expressed.

<1-2. Outline of Processing>

The outline of processing executed in the print system according to the first embodiment will be described. In the personal computer 1, print start operation is executed in the running application program 122, and the printer driver 123 is activated. Upon activation of the printer driver 123, the controller 11 of the personal computer 1 executes the following processing of (A) to (C) as image process for allowing the printer 2 to print a target image.

(A) Image processing including color conversion processing and halftone process is applied to image data (original image data) expressed by RGB values of 256 gradation levels (RGB values each ranging from 0 to 255 (8-bit range)) expressing a target image to be printed to generate print data representing dot formation modes (large dot, medium dot, small dot, and no dot) for respective colors of C, M, Y, and K (processing of S11 to S13 to be described later using FIG. 3).

(B) Ink amount adjustment process is applied to the generated print data to generate adjusted print data (processing of S14 to be described later using FIG. 3).

(C) The generated adjusted print data is supplied to the printer 2 (processing of S15 to be described later using FIG. 3).

After execution of the above processing (A) to (C) on the personal computer 1, the printer 2 prints, at the print execution section 26, an image expressed by the adjusted print data supplied from the personal computer 1. Specifically, the printer 2 ejects ink droplets from the nozzle based on the adjusted print data while moving the print head 27 of the print execution section 26 in the main scanning direction to print an image corresponding to a band-like print area (hereinafter, simply referred to as band) that is a unit area for printing and has the same width as the nozzle width (length of the nozzle array in the sub-scanning direction) in a single main scan of the print head. That is, the image is printed on the band while the print head ejects ink during one main scan. Then, the printer 2 alternately performs reciprocation of the print head 27 and conveyance of a paper sheet in the sub-scanning direction so that band-by-band image print operation is repeated while the position of a paper sheet is shifted in the sub-scanning direction, whereby the image is printed on the entire paper surface.

Figure 2B:
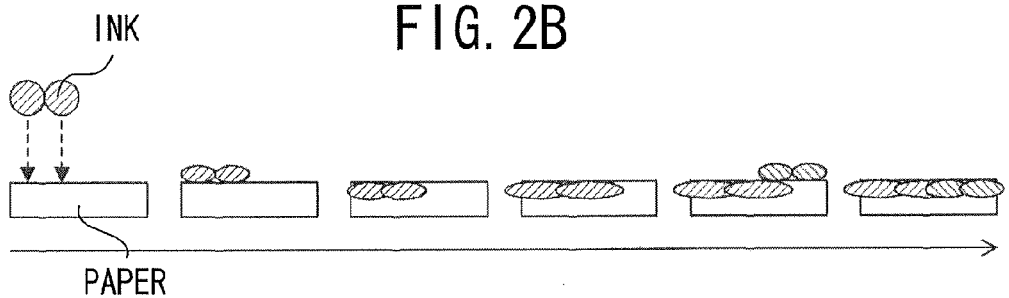
FIG. 2B is an explanatory diagram illustrating a reason that the streak is generated.

In one-pass printing in which the paper sheet is conveyed by the nozzle width for each main scan (one pass) of the print head 27 to complete printing of an image of a predetermined area in a single main scan (one pass), a high-density streak may be generated at the joint between adjacent two bands. That is, in the one-pass printing, a band on the upper side of the joint is printed first as illustrated in FIG. 2A (step 1) and then a band on the lower side of the joint is printed (step 2). At this time, as illustrated in FIG. 2B, the lower edge portions (corresponding to the joint with the lower-side band) of the ink droplets of the upper-side band are permeated into the paper sheet to increase the area where the ink droplets are overlapped, which seems to be a cause of the generation of the streak.

In order to cope with the above problem, in the embodiment, the personal computer 1 performs ink amount adjustment process for reducing the total amount of ink used in the area corresponding to the joint between the bands after the halftone process, so as to make the streak less likely to occur.

<1-3. Concrete Explanation of Process>

A concrete process that the controller 11 (CPU 111) of the personal computer 1 executes as the function of the printer driver 123 will be described using the flowchart of FIG. 3.

In S11, the controller 11 performs color conversion process to generate image data expressed by CMYK values of 256 gradation levels corresponding to ink colors (CMYK) used in the printer 2 for printing, from original image data expressed by RGB values of 256 gradation levels expressing an image to be printed. This color conversion process is performed according to a previously stored look-up table (RGB→CMYK).

Subsequently, in S12, the controller 11 performs, with respect to each of all the pixels constituting the image data obtained after the color conversion process, ink total amount restriction process such that the total amount of the CMYK values becomes greater than or equal to a restriction value. This ink total amount restriction process is performed according to a previously stored look-up table (CMYK→CMYK).

In S13, the controller 11 performs halftone process (error diffusion process in the embodiment) to generate image data (print data) expressed by CMYK values of four gradation levels that can be expressed by the printer 2, from the image data (image data expressed by CMYK values of 256 gradation levels) obtained after the ink total amount restriction process.

In S14, the controller 11 performs ink amount adjustment process to generate print data (adjusted print data) in which the total amount of the ink used for the printing of the rear edge raster of the band (raster at the edge of a first band on the side adjacent to a second band to be printed after the first band), from the print data obtained after the halftone process. The details of the ink amount adjustment process will be described later.

In S15, the controller 11 performs print data supply process to supply the adjusted print data to the printer 2. As a result, in the print execution section 26 of the printer 2, an image based on the adjusted print data is printed on a paper sheet.

Figure 4:
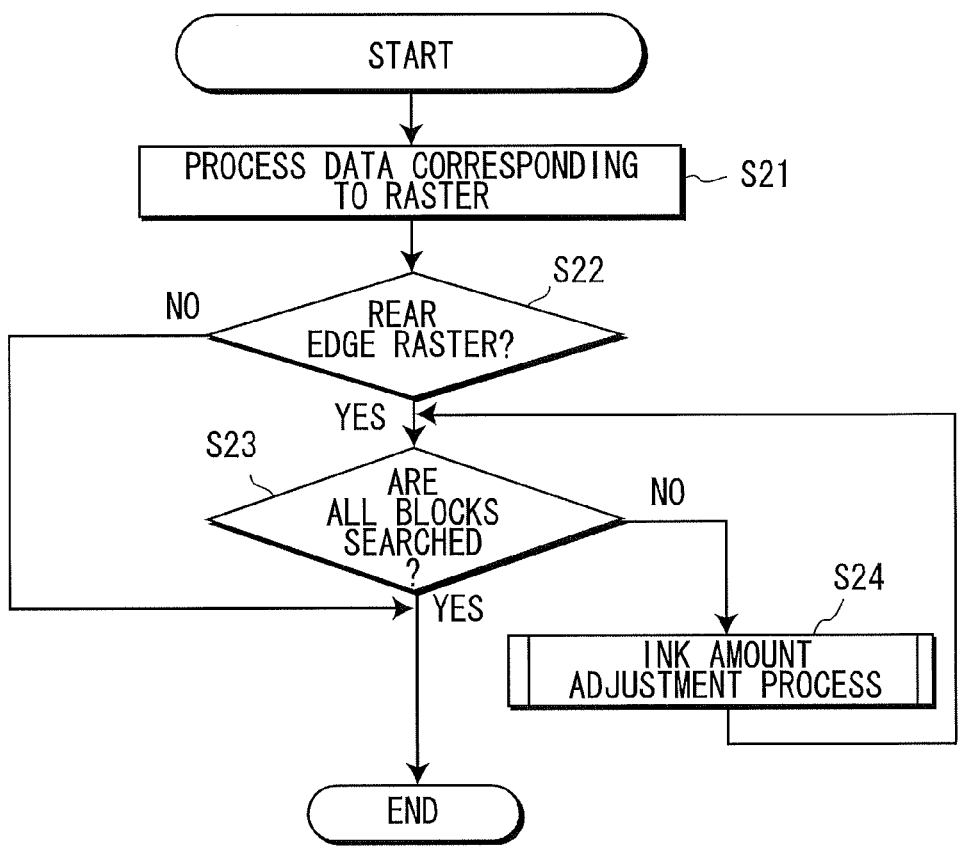
FIG. 4 is a flowchart illustrating a process for determining whether line image data is subject to an ink amount adjustment process.

The ink amount adjustment process executed in S14 will next be described. The image data to be processed includes a plurality of sets of partial image data corresponding to the band. Further, each partial image data includes a plurality sets of line data. Each line data corresponds to an image of one line (one raster) extend in the main scanning direction. As illustrated in the flowchart of FIG. 4, the ink amount adjustment process is applied to line image data corresponding to the rear edge raster of a band. Here, the rear edge raster positioned most downstream side in the sub-scanning direction in the band.

That is, the image data to be processed is subjected to the above image process for each line image data corresponding to a raster (one line) (S21). When the line image data to be processed is edge portion data corresponding to the rear edge raster (YES in S22), the controller 11 executes the ink amount adjustment process for each block data obtained by dividing the line image data into a plurality of blocks (S23 and S24). When the line image data to be processed is non-edge portion data not corresponding to the rear edge raster (NO in S22), the ink amount adjustment process is not executed. The processing of S21 corresponds to the aforementioned color conversion processing (S11), ink total amount restriction process (S12), and halftone process (S13). The processing of S22 to S24 corresponds to the ink amount adjustment process (S14) (In other words, description of S22 and S23 is omitted in FIG. 3). Whether the line image data to be processed corresponds to the rear edge raster or not can be determined based on acquisition of nozzle numbers (use nozzle numbers) of the print head 27 assigned to the line image data.

<1-4. Outline of Ink Amount Adjustment Process>

Figure 5:
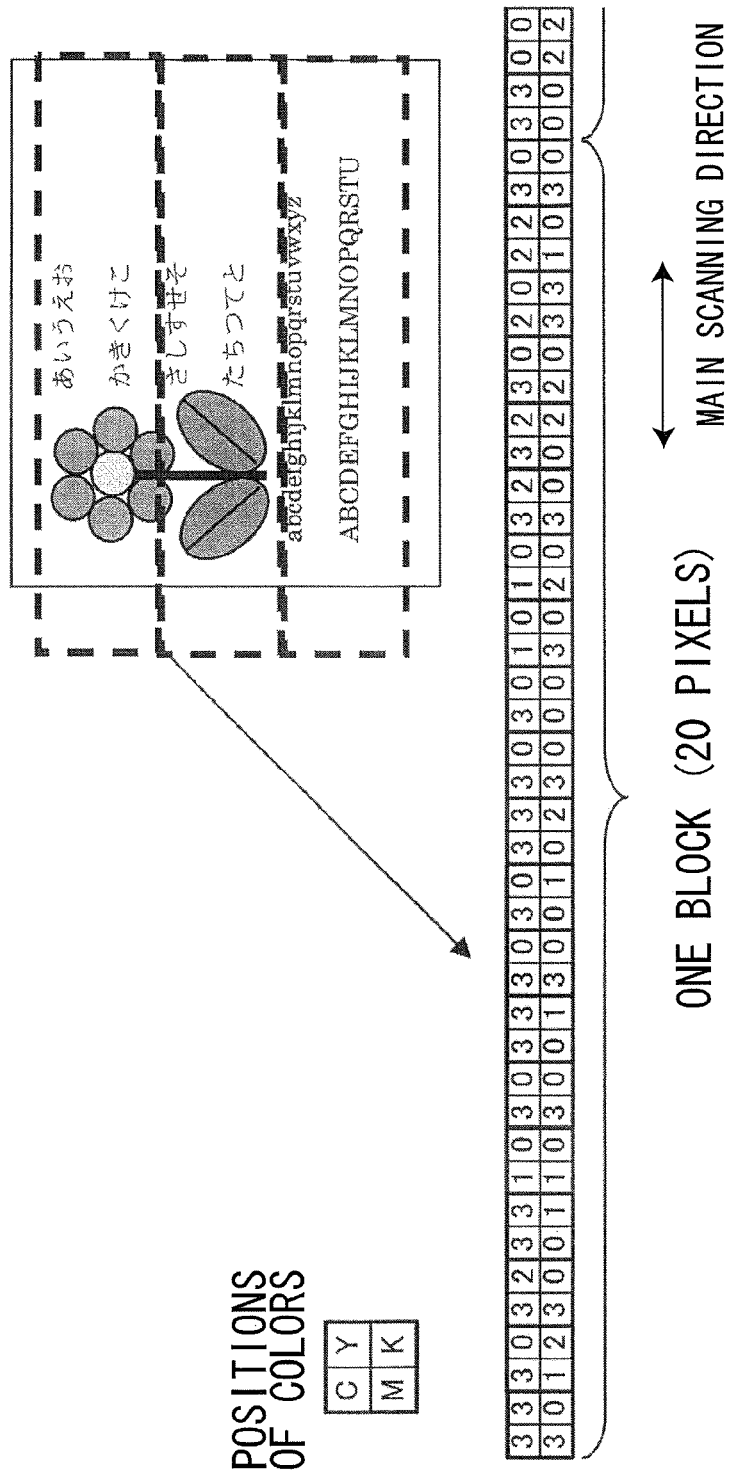
FIG. 5 is an explanatory diagram illustrating block data.

The outline of the ink amount adjustment process executed in S24 will be described. As shown in FIG. 5, the line image data corresponding to the rear edge raster is divided into a plurality of block data each composed of a plurality of pixels (in the embodiment, 20 pixels). One block data preferably has a length of about 0.5 mm to 2 mm that allows the streak to be easily visually confirmed at the time of printing. In the case where one block is composed of 20 pixels as in the embodiment, when one block data is printed with a printing resolution of 600 dpi, the length of the one block data is about 0.84 mm.

Each block data includes 20 sets of dot data corresponding to dots of 20 pixels arranged on a print medium in the main scanning direction, and each dot data indicates size information concerning the sizes of the dots of respective CMYK colors. In FIG. 5, dot data corresponding to one pixel is expressed by four numerical values arranged in a 2×2 grid. Respective values of upper-left cell, lower-left cell, upper-right cell, and lower-right cell are the size information of CMYK colors, respectively, and numerical values of 0, 1, 2, and 3 indicate no dot, small dot, medium dot, and large dot, respectively.

The ink amount adjustment process will be described using concrete numerical values. The left side table of FIG. 6A illustrates an example of values obtained by counting the number of sets of the dot data corresponding to 20 pixels included in the block data classified according to the ink color (CMYK) and size information (large, medium, small). The center table of FIG. 6A illustrates a calculation process of a target ink amount and a target reduction amount based on the counted values. The right table of FIG. 6A shows values obtained by counting the number of sets of dot data classified according to the ink color and size information after ink amount reduction amount is performed, and shows an amount of the ink to be used for each ink color.

The size information indicated by the dot data and ink droplet amount used for forming the dot having the size have a predetermined relationship. Therefore, the total ink amount (hereinafter, referred to as "CMYK total ink amount") to be used for the block data can be calculated based on the size information of the dot data corresponding to 20 pixels included in the block data. In the embodiment, the ink droplet amounts of large dot, medium dot, and small dot are 16 pl, 5 pl, and 3 pl, respectively. The amount of each of the CMYK color inks to be used is calculated by multiplying the ink droplet amount by the number of sets of the dot data for each size and for the corresponding color, and by accumulating the multiplied values of each size of the corresponding color.

In the example of FIG. 6A, the numbers of sets of dot data for C (cyan) is 15 (large dot), 2 (medium dot), and 3 (small dot), so that the ink amount to be used is 259 pl (=16 pl×15+5 pl×2+3 pl×3=240 pl+10 pl+9 pl). Similarly, the ink amounts to be used for M (magenta), Y (yellow), and K (black) are calculated as 163 pl, 84 pl, and 40 pl, respectively. By summing up these values, the CMYK total ink amount is calculated (546 pl, in the example of FIG. 6A).

Figure 7A:
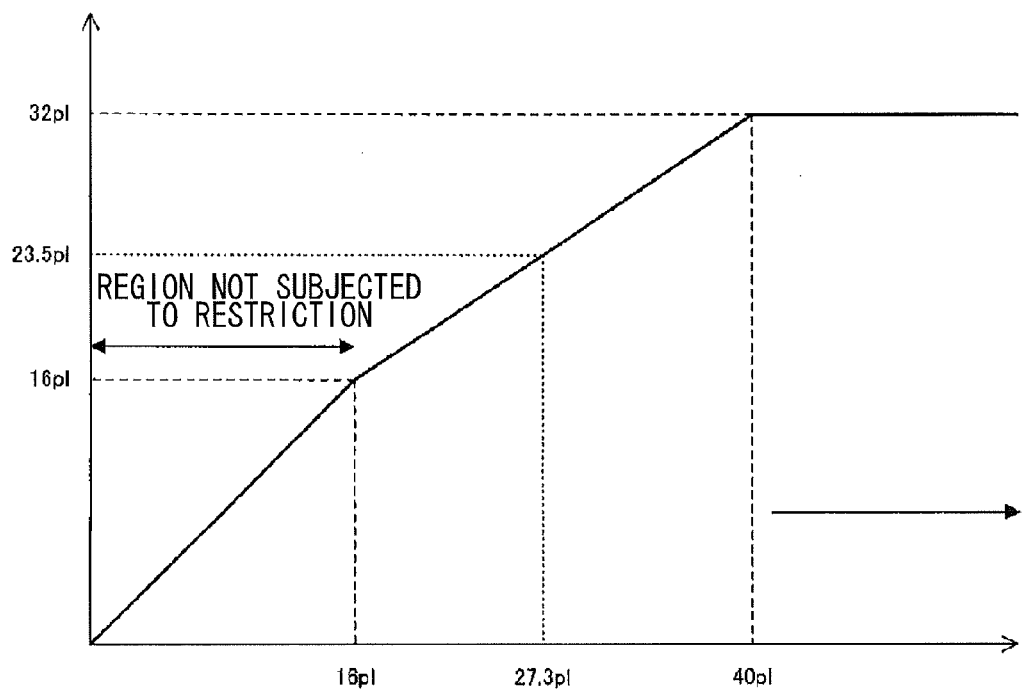
FIG. 7A is a graph showing a relation between an ink amount index value and a ink amount restriction value that increases when the ink amount index value increases.

The CMYK total ink amount thus calculated is divided by 20 which is the number of pixels included in the block data, whereby the average ink amount (hereinafter, referred to as "ink amount index value") to be used per one pixel (546 pl/20=27.3 pl) is calculated. Then, based on the ink amount index value, an ink amount restriction value which is a restriction value (target value) of the ink amount per one pixel is set. FIG. 7A is a graph representing the correspondence relationship between the ink amount index value and the ink amount restriction value. This correspondence relationship is previously stored in the storage section 12 as a computation expression or a look-up table. In the example of FIG. 7A, the minimum ink amount index value to be restricted is set to 16 pl. That is, when the ink amount index value is smaller than 16 pl, the ink amount is not restricted. The maximum ink amount restriction value becomes 32 pl when the ink amount index value is 40 pl. The ink amount restriction value corresponding to the ink amount index value in a range of 16 pl to 40 pl linearly increases within a range of 16 pl to 32 pl with an increase in the ink amount index value. This is because although the ink amount restriction value needs to be significantly reduced when the ink amount index value is the maximum, the reduction in the ink amount restriction value can be reduced as the ink amount index value becomes smaller.

By referring to such a correspondence relationship, the ink amount restriction value (about 23.5 pl, in this example) corresponding to the calculated ink amount index value (27.3 pl) is set. Then, a value obtained by multiplying the ink amount to be used for each of CMY colors by a factor (23.5 pl/27.3 pl=0.862) calculated by dividing the ink amount restriction value by the ink amount index value is the target ink amount for each of CMY colors (223.3 pl for C, 140.5 pl for M, and 72.4 pl for Y, in the example of FIG. 6A). A value obtained by subtracting the target ink amount for each of CMY colors from the ink amount to be used for each of CMY colors is the target reduction amount for each of CMY colors (35.7 pl for C, 22.5 pl for M, and 11.6 pl for Y, in the example of FIG. 6A). In the embodiment, the ink amount to be used for K (black) is maintained. Thus, the ink amount to be used for K is not multiplied by the factor, resulting in a target reduction amount of 0 for K.

Then, the size information of the dot data is changed so that the ink amount to be used for each of CMY colors is reduced by the calculated target reduction amount. Specifically, in the case where the size information of the dot data is changed from large dot to medium dot, an ink amount of 11 pl (=16 pl-5 pl) can be reduced per one dot. Similarly, in the case where the size information of the dot data is changed from medium dot to small dot, an ink amount of 2 pl (=5 pl-3 pl) can be reduced per one dot. Further, in the case where the size information of the dot data is changed from small dot to no dot, an ink amount of 3 pl (=3 pl-0 pl) can be reduced per one dot.

In the embodiment, large dot is changed to medium dot, medium dot is changed to small dot, and small dot is changed to no dot. That is, the size information is reduced by one level. Specifically, in the above three pattern changes, the highest priority is given to the change from large dot to medium dot, while the lowest priority is given to the change from small dot to no dot, and the ink amount is reduced such that the ink amount does not fall below the target ink amount (such that an actually reduced ink amount does not exceed the target reduction amount).

In the example of FIG. 6A, to attain the target ink amount of 2233 pl (target reduction amount of 35.7 pl) for C (cyan), the size information of three sets of the dot data is changed from large dot to medium dot. This reduces the number of sets of the dot data in which the size information has been set to large dot by three and increases the number of sets of the dot data in which the size information has been set to medium dot by three, with the result that the ink amount of 33 pl (=16 pl×3-5 pl×3=11 pl×3) is reduced. Subsequently, the size information of one set of the dot data is changed from medium dot to small dot. This reduces the number of sets of the dot data in which the size information has been set to medium dot by one and increases the number of sets of the dot data in which the size information has been set to small dot by one, with the result that the ink amount of 2 pl (=5 pl×1-3 pl×1=2 pl×1) is reduced. Thus, in total, an ink amount of 35 pl (=33 pl+2 pl) is reduced, that is, the ink amount to be used is reduced from 259 pl to 224 pl.

The dot data subjected to the size information change is randomly selected from among the sets of the dot data having size information to be selected, and the size information is changed with the dot position maintained (without changin the dot position). However, dot data whose size information has changed is excluded from selection candidates. This is in order to prevent the size information from being reduced by two levels or more, that is, to prevent the dot data whose size information has been changed from large dot to medium dot from being changed further from medium dot to small dot.

The size information for M (magenta) is changed in the same manner to reduce the ink amount to be used from 163 pl to 141 pl. Further, the size information for Y (yellow) is changed in the same manner to reduce the ink amount to be used from 84 pl to 73 pl. The target reduction amount for K (black) is 0, and thus the ink amount to be used is not reduced. Thus, the CMYK total ink amount after the reduction is 478 pl (=224 pl+141 pl+73 pl+40 pl). The average ink amount per one pixel after the reduction is 23.9 pl (=478 pl/20).

<1-5. Concrete Explanation of Ink Amount Adjustment Process>

Figure 8:
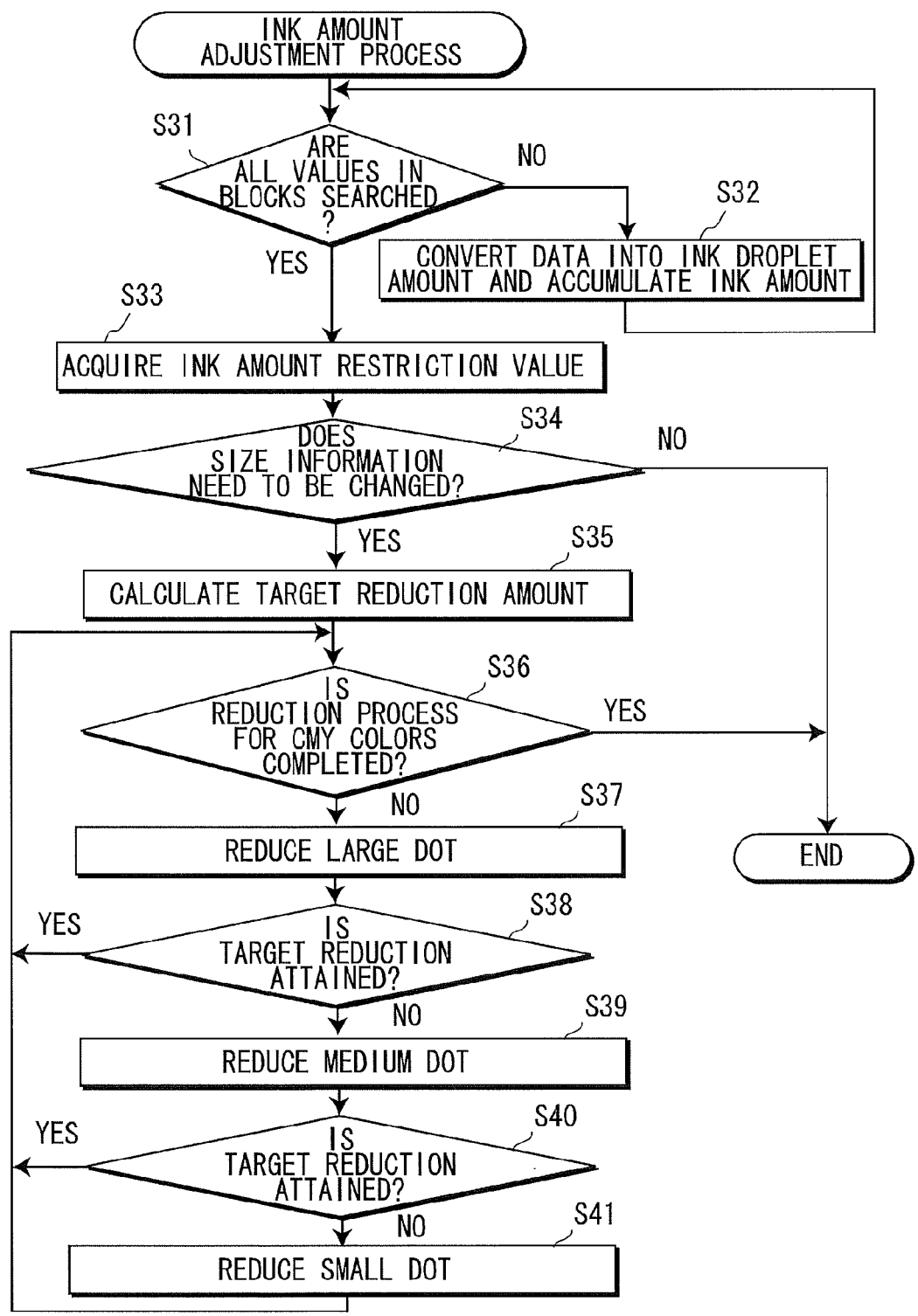
FIG. 8 is a flowchart illustrating the ink amount adjustment process.

A ink amount adjustment process will next be described concretely. FIG. 8 is a flowchart of the ink amount adjustment process executed in S24 of FIG. 4.

After starting the ink amount adjustment process, the controller 11 determines, in S31, whether processing of S32 to be described later has been performed for all sets of the dot data corresponding to 20 pixels belonging to the block data to be processed. When determining that there is any unprocessed dot data in S31 (S31: No), the controller 11 selects one of the unprocessed set of dot data as the dot data (target dot data) to be processed and thereafter advances to S32. Then, the controller 11 converts the size information of each of CMYK colors for the target dot data into the ink droplet amount and accumulates the ink droplet amounts (add the presently acquired ink droplet amount to the acquired ink droplet amount that was acquired in the previous step S32) as the ink amount to be used for each of CMYK colors (in the example of FIG. 6A, values accumulated for all sets of the dot data belonging to the block data to be processed are 259 pl, 163 pl, 84 pl, and 40 pl, respectively). Thereafter, the controller 11 returns to S31.

When determining that processing of S32 has been performed for all sets of the dot data belonging to the block data to be processed (there is no unprocessed dot data) (S31: Yes), the controller 11 advances to S33. Then, the controller 11 divides the total ink amount (hereinafter, referred to as "CMYK total ink amount" which is 546 pl in the example of FIG. 6A) to be used for all CMYK colors by 20 which is the number of pixels in one block to calculate the ink amount index value (27.3 pl in the example of FIG. 6A). Then, with reference to the correspondence relationship illustrated in FIG. 7A, the controller 11 acquires the ink amount restriction value (about 23.5 pl) corresponding to the calculated ink amount index value (27.3 pl).

Subsequently, in S34, the controller 11 determines whether the size information of the target dot data needs to be changed. Specifically, the controller 11 determines that the size information needs to be changed when the ink amount restriction value (about 23.5 pl) falls below the ink amount index value. That is, when the ink amount index value is equal to or smaller than a threshold value (16 pl, in the example of FIG. 7A) defining the restriction range, the size information of the dot data is not changed, while when the ink amount index value exceeds the threshold value, the size information of the dot data is changed. When determining in S34 that the size information needs to be changed, the controller 11 advances to S35 and uses the factor (0.862, in the example of FIG. 6A) obtained by dividing the ink amount restriction value by the ink amount index value to calculate the target reduction amount for each of CMY colors (35.7 pl, 22.5 pl, and 11.6 pl, in the example of FIG. 6A) according to the following equation:

(target reduction amount)=(ink amount to be used for each of CMY colors)×(1−factor).

Here, the ink amount to be used for K (pigment ink) is maintained, thus, the target reduction for K ink is 0.

Subsequently, in S36, the controller 11 determines whether ink amount reduction process (S37 to S41 to be described later) for each of CMY colors has been completed. When determining in S36 that there is any unprocessed color (S36: No), the controller 11 selects one of the unprocessed colors as the color (target color) to be processed and then advances to S37. Then, the controller 11 changes as many large dots as possible to medium dots with respect to the size information of the color dot data (reduces as many large dots as possible) within a range where the ink reduction amount does not exceed the target reduction amount.

Subsequently, in S38, the controller 11 determines whether the target reduction amount has been attained. Specifically, the controller 11 determines that the target reduction has been attained when the ink amount reduction based on the reduction in the number of large dots is equal to or larger than a value obtained by subtracting a numerical value N from the target reduction amount. The reason that the value obtained by subtracting the numerical value N from the target reduction amount is used as a determination criterion is to prevent the ink reduction amount from exceeding the target reduction amount. Thus, to reduce the ink amount as much as possible within the target reduction amount, the value N is set to a minimum value (2 pl in the embodiment which corresponds to a reduction amount based on a change from medium dot to small dot) of ink reduction amount among ink amount reduction amounts by changing the size of one dot. That is, a case where the ink reduction amount is equal to or larger than a value obtained by subtracting 2 from the target reduction amount indicates a case where the maximum reduction has been attained within the target reduction amount. When determining in S38 that the target reduction amount has been attained (S38: Yes), the controller 11 returns to S36. On the other hand, when determining that the ink amount target reduction amount has not been attained (S38: No), the controller 11 advances to S39 and changes as many medium dots as possible to small dots with respect to the size information of the target color dot data (reduces as many medium dots as possible) within a range where the ink reduction amount (reduction amount obtained by adding reduction amount based on the reduction in the number of large dots and reduction amount based on the reduction in the number of medium dots) does not exceed the target reduction amount.

Subsequently, in S40, the controller 11 determines whether the target reduction amount has been attained. Specifically, the controller 11 determines that the target reduction amount has been attained when the sum of the ink reduction amounts based on the reduction amounts in the number of large dots and the reduction in the number of medium dots is equal to or larger than a value obtained by subtracting the numerical value N (e.g., 2) from the target reduction amount. When determining in S40 that the target reduction amount has been attained (S40: Yes), the controller 11 returns to S36. On the other hand, when determining that the target reduction amount has not been attained (S40: No), the controller 11 advances to S41 and changes as many small dots as possible to no dots with respect to the size information of the target color dot data (reduces as many small dots as possible) within a range where the ink reduction amount (reduction amount obtained by adding reduction amount based on the reduction in the number of large dots, reduction amount based on the reduction in the number of medium dots, and reduction amount based on the reduction in the number of small dots) does not exceed the target reduction amount. Thereafter, the controller 11 returns to S36. In the embodiment, the ink reduction amount (2 pl) based on a change from medium dot to small dot is smaller than the ink reduction amount (3 pl) based on a change from small dot to no dot, so that the change from small dot to no dot is not performed unless the number of selection candidates of medium dot is insufficient. Thus, when it is apparent that number of selection candidates of medium dot will not become insufficient, the processing of S40 and S41 can be omitted.

When determining in S36 that the ink amount reduction process for each of CMY colors has been completed (S36: Yes) or determining that the size information need not be changed (S34: No), the controller 11 ends the ink amount adjustment process.

<1-6. Effect>

As described above, according to the first embodiment, the block data is obtained by dividing, into a plurality of blocks, the line image data corresponding to the rear edge raster of the band in the print data obtained after the halftone process is performed. When the ink amount to be used is comparatively large, the size information of at least one of a plurality of sets of dot data included in the block data is changed for each set of block data so as to reduce the ink amount to be used. Specifically, the size information of the dot data is changed for each set of block data so that the ink amount index value (average ink amount) obtained after the ink amount adjustment process is performed indicates the ink amount restriction value.

Thus, the amount of the ink required for printing of the rear edge raster of the band can be reduced adequately according to the ink amount to be used, whereby the streak that can be generated in the joint between the two bands printed through two different main scans can be reduced. When the ink amount to be used is comparatively low, the size information of each dot data included in the block data is not changed, preventing the ink use amount from being reduced unnecessarily. In particular, since the ink amount restriction value is increased according to an increase in the ink amount index value, the ink amount restriction value can be set to an appropriate value according to the ink amount index value.

Further, the process to change large dot to medium dot in the size information of the dot data is prioritized, so that ink amount can effectively be reduced. That is, the larger the ink droplet amount of one dot is, the larger the dot size becomes, achieving the higher density. However, the ink droplet amount of one dot is not proportional to the density. For example, in the embodiment, the droplet amounts of large dot, medium dot, and small dot are 16 pl, 5 pl, and 3 pl, respectively, while the density ratio is 10:5:3.6. That is, the higher the percentage of large dot in a given image, the larger the use amount of the ink required for expressing the image. Thus, preferentially reducing the number of large dots allows an effective reduction of the ink amount.

Further, in the embodiment, the factor for converting the ink amount index value into ink amount restriction value is calculated for each block data, and the size information of at least one set of dot data corresponding to the dots formed by CMY inks (dye inks) which are included in the block data is changed so as to reduce the ink amount to be used for each of the CMY colors according to the factor. The ink amount to be used for K (pigment ink) is maintained. Thus, although the total ink amount for K is not reduced to the ink amount restriction value, the streak can be reduced because the pigment ink is unlikely to generate the streak in the joint between the bands.

That is, as described above, the dye ink easily permeates into fibers of the paper sheet to easily generate the streak, while the pigment ink is hard to permeate into the inside of the paper sheet but fixed to the paper surface, making it unlikely to generate the streak. Since no permeation appears, a reduction in the amount of the pigment ink disadvantageously results in a visible white line. Therefore, by changing the size information of the dot data corresponding to each of the dots formed by the dye inks so that the ink amounts of the dye inks are reduced while the ink amount of the pigment ink is not reduced, the print quality can be enhanced. In addition, the ink amounts of the CMY colors are reduced in the same ratio, making it difficult to cause a change in the appearance of color (color shade).

<2. Second Embodiment>
<2-1. Difference from Print System of First Embodiment>

A print system according to a second embodiment is similar to that according to the first embodiment but differs therefrom in how to calculate the target ink amount in the ink amount adjustment process. Specifically, in the first embodiment, the ink amount restriction value is set based on the ink amount index value obtained by dividing the CMYK total ink amount by 20 which is the number of pixels, and a value obtained by multiplying the ink amount to be used for each of CMY colors by a factor calculated by dividing the ink amount restriction value by the ink amount index value is used as the target ink amount for each of CMY colors. That is, the factor calculated based on the value including K (black) is used to reduce the ink amount for each of CMY colors. On the other hand, in the second embodiment, a CMY factor is calculated based on a value excluding K (black), and a value obtained by multiplying the ink amount to be used for each of CMY colors by the CMY factor is used as the target ink amount for each of CMY color. The explanations are abbreviated for the configuration in common with the first embodiment.

<2-2. Ink Amount Adjustment Process>

Using concrete numerical values, a procedure of the ink amount adjustment process according to the second embodiment will be described with reference to FIG. 6B. FIG. 6B illustrates the three tables similar to those of FIG. 6A.

As in the first embodiment, the amount of each of the CMYK color inks to be used is calculated for each block data (259 pl, 163 pl, 84 pl, and 40 pl), and these values are summed up to calculate the CMYK total ink amount (546 pl). The CMYK total ink amount thus calculated is divided by 20 which is the number of pixels, whereby the ink amount index value is calculated (546 pl/20=27.3 pl). Then, by referring to a correspondence relationship illustrated in FIG. 7A, the ink amount restriction value (about 23.5 pl) corresponding to the calculated ink amount index value (27.3 pl) is set.

In the second embodiment, the thus calculated ink amount restriction value is multiplied by 20 which is the number of pixels to calculate a CMYK total restriction value (470.7 pl, in the example of FIG. 6B) which is the ink amount restriction value per one block data. Then, by subtracting the ink amount (40 pl, in the example of FIG. 6B) to be used for K (black) from the CMYK total restriction value, a CMY total restriction value (470.7 pl-40 pl=430.7 pl) is calculated. The thus calculated CMY total restriction value is divided by a CMY total ink amount (506 pl, in the example of FIG. 6B) which is a summation of the ink amounts to be used for CMY colors to calculate the CMY factor (430.7 pl/506 pl=0.851). A value obtained by multiplying the ink amount to be used for each of CMY colors by the thus calculated factor is the target ink amount for each of CMY colors (220.4 pl, 138.7 pl, and 71.5 pl, in the example of FIG. 6B). Further, a value obtained by subtracting the target ink amount for each of CMY colors from the ink amount to be used for each of CMY colors is the target reduction amount for each of CMY colors (38.6 pl, 24.3 pl, and 12.5 pl in the example of FIG. 6B).

Then, as in the first embodiment, the size information of the dot data is changed so that the ink amount to be used for each of CMY colors is reduced by the calculated target reduction amount. In the example of FIG. 6B, to attain the target ink amount of 220.4 pl (target reduction amount of 38.6 pl) for C (cyan), the size information of three dot data is changed from large dot to medium dot, with the result that the ink amount of 33 pl (=11 pl×3) is reduced. Subsequently, the size information of two dot data is changed from medium dot to small dot, with the result that the ink amount of 4 pl (=2 pl×2) is reduced. As a result, the ink amount to be used is reduced from 259 pl to 222 pl.

The size information for M (magenta) is changed in the same manner to reduce the ink amount to be used from 163 pl to 139 pl. Further, the size information for Y (yellow) is changed in the same manner to reduce the ink amount to be used from 84 pl to 73 pl. Thus, the CMYK total ink amount after the reduction is 474 pl (=222 pl+139 pl+73 pl+40 pl). The average ink amount per one pixel after the reduction is 23.7 pl (=474 pl/20).

<2-3. Concrete Explanation of Ink Amount Adjustment Process>

A concrete procedure of the ink amount adjustment process is similar to that in the first embodiment (FIG. 8) but differs in S35. That is, in S35, the controller 11 multiplies the ink amount restriction value by 20 which is the number of pixels to calculate the CMYK total restriction value and then subtracts the ink amount to be used for K (black) from the CMYK total restriction value to calculate the CMY total restriction value. The controller 11 then uses the CMY factor calculated by dividing the thus calculated CMY total restriction value by the CMY total ink amount which is a summation of the ink amounts to be used for CMY colors to calculate the target reduction amount for each of CMY colors according to the following equation:

(target reduction amount)=(ink amount to be used for each of CMY colors)×(1−CMY factor).

<2-4. Effect>

As described above, according to the second embodiment, the CMY factor for converting the CMY total ink amount which is a summation of the ink amounts to be used for CMY inks (dye ink) into the CMY total restriction value obtained by subtracting the ink amount to be used for K (pigment ink) from the CMYK total restriction value is calculated for each block data. Then, the size information of at least one set of dot data corresponding to the dots formed by CMY inks which are included in the block data is changed so as to reduce the ink amount to be used for each of the CMY inks according to the CMY factor. In other words, a percentage for converting a dye index value concerning the amount of the dye inks to be used extracted from the amount of all inks to be used into a dye target index value which is an index value concerning the ink amount obtained by subtracting the amount of pigment ink to be used from the restriction target ink amount is calculated for each block data. The size information of at least one set of dot data corresponding to the dots formed by the dye inks which are included in the block data is changed so that the amount of the dye inks to be used is reduced according to the percentage. As described above, by reducing the amount of CMY inks (dye inks) to be used in consideration that the amount of the K ink (pigment ink) to be used is maintained, the ink amount index value is reduced to a value close to the ink amount restriction value, whereby the streak can be reduced while the amount of K ink is maintained.

<3. Third Embodiment>

<3-1. Difference from Print System of First Embodiment>

A print system according to a third embodiment is similar to that according to the first embodiment but differs therefrom in that the amount of K (black) ink is reduced in the ink amount adjustment process. Specifically, in the first embodiment, a value obtained by multiplying the ink amount to be used for each of CMY colors by a factor calculated by dividing the ink amount restriction value by the ink amount index value is used as the target ink amount for each of CMY colors, and the ink amount for K is not reduced. On the other hand, in the third embodiment, a value obtained by multiplying the ink amount to be used for each of CMYK colors by a factor calculated by dividing the ink amount restriction value by the ink amount index value is used as the target ink amount for each of CMYK colors (the amount of K ink is also reduced). The explanations are abbreviated for the configuration in common with the first embodiment.

<3-2. Ink Amount Adjustment Process>

Using concrete numerical values, the ink amount adjustment process according to the third embodiment will be described with reference to FIG. 6C. FIG. 6C illustrates the three tables similar to those of FIG. 6A.

Similarly to the first embodiment, the amount of each of the CMYK color inks to be used is calculated for each block data (259 pl, 163 pl, 84 pl, and 40 pl), and these values are summed up to calculate the CMYK total ink amount (546 pl). The CMYK total ink amount thus calculated is divided by 20 which is the number of pixels, whereby the ink amount index value is calculated (546 pl/20=27.3 pl). Then, by referring to a correspondence relationship illustrated in FIG. 7A, the ink amount restriction value (about 23.5 pl) corresponding to the calculated ink amount index value (27.3 pl) is set.

In the third embodiment, a value obtained by multiplying the ink amount to be used for each of CMYK colors by a factor (23.5 pl/27.3 pl=0.862) calculated by dividing the thus calculated ink amount restriction value by the ink amount index value is used as the target ink amount for each of CMYK colors (223.3 pl, 140.5 pl, 72.4 pl, and 34.5 pl, in the example of FIG. 6C). Further, a value obtained by subtracting the target ink amount for each of CMYK colors from the ink amount to be used for each of CMYK colors is the target reduction amount for each of CMYK colors (35.7 pl, 22.5 pl, 11.6 pl, and 5.5 pl in the example of FIG. 6C).

Then, the size information of the dot data is changed so that the ink amount to be used for each of CMYK colors is reduced by the calculated target reduction amount. The dot data corresponding to CMY is processed in the same manner as in the first embodiment. As to the dot data corresponding to K (black), to attain the target ink amount of 34.5 pl (target reduction amount of 5.5 pl), the size information of two dot data is changed from medium dot to small dot, with the result that the ink amount of 4 pl (=2 pl×2) is reduced. As a result, the ink amount to be used is reduced from 40 pl to 36 pl. Thus, the CMYK total ink amount after the reduction is 474 pl (=224 pl+141 pl+73 pl+36 pl). The average ink amount per one pixel after the reduction is 23.7 pl (=474 pl/20).

<3-3. Concrete Explanation of Ink Amount Adjustment Process>

The ink amount adjustment process is similar to that in the first embodiment (FIG. 8) but differs in S35 and S36. That is, in S35, the controller 11 uses the factor calculated by dividing the ink amount restriction value by the ink amount index value to calculate the target reduction amount of the ink amount for each of CMYK colors according to the following equation:

(target reduction amount)=(ink amount to be used for each of CMYK colors)×(1−factor).

Then, in S36, the controller 11 determines whether the ink amount reduction process (S37 to S41) for each of CMYK colors has been completed.

<3-4. Effect>

As described above, according to the third embodiment, the factor for converting the ink amount index value into the ink amount restriction value is calculated for each block data, and the size information of at least one set of dot data corresponding to the dots formed by CMYK inks which are included in the block data is changed so as to reduce the ink amount to be used for each of the CMYK inks according to the factor. That is, the amount of K ink to be used is also reduced to thereby reduce the streak while supressing a change in the appearance of color.

<4. Variations>

While the invention has been described in detail with reference to the embodiments thereof, it would be apparent to those skilled in the art that various changes and modifications may be made therein without departing from the scope of the invention.

(1) Although large dot is changed to medium dot, medium dot is changed to small dot, and small dot is changed to no dot in the above respective embodiments, the invention is not limited to this, but the change to no dot need not always be performed. For example, omission of the processing of S40 and S41 (change from small dot to no dot) of FIG. 8 prevents the number of dots formed on a print medium from being reduced, thereby preventing a thin line from disappearing. Further, the size information may be reduced by two levels or more, just as large dot is changed to small dot.

Figure 7B:
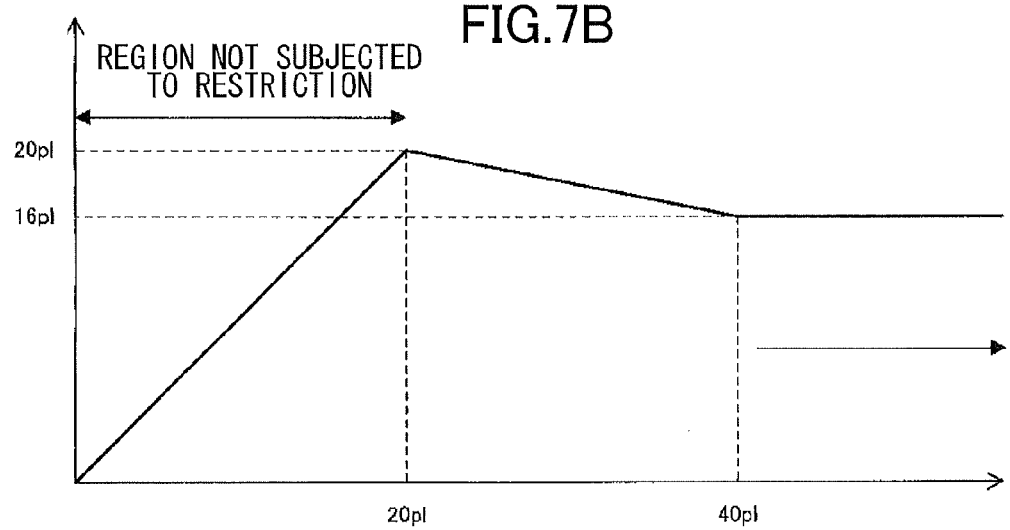
FIG. 7B is a graph showing a relation between the ink amount index value and the ink amount restriction value that decreases when the ink amount index value increases.

(2) In the above respective embodiments, the correspondence relationship between the ink amount index value and ink amount restriction value is specified so that the ink amount restriction value increases with an increase in the ink amount index value, as illustrated in FIG. 7A. Instead, however, as illustrated in FIG. 7B, the correspondence relationship between the ink amount index value and ink amount restriction value is specified so that the ink amount restriction value decreases with an increase in the ink amount index value. Such a correspondence relationship can be effective since the larger the time length between the printing of one band of the adjacent two bands and printing of the other band thereof, the larger the range over which the ink droplets of the band printed first at the joint are permeated. Further, the ink amount restriction value only needs to be changed monotonically according to a change in the ink amount index value. For example, the ink amount restriction value may be changed stepwise.

Figure 9A:
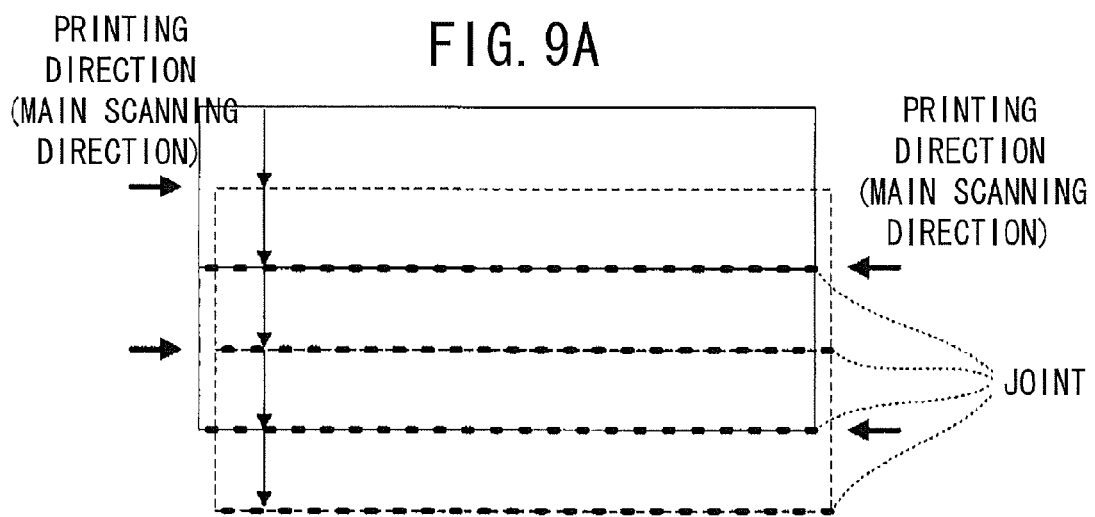
FIG. 9A is an explanatory diagram illustrating streak generated by two pass printing in which a paper conveyance amount is even.
Figure 9B:
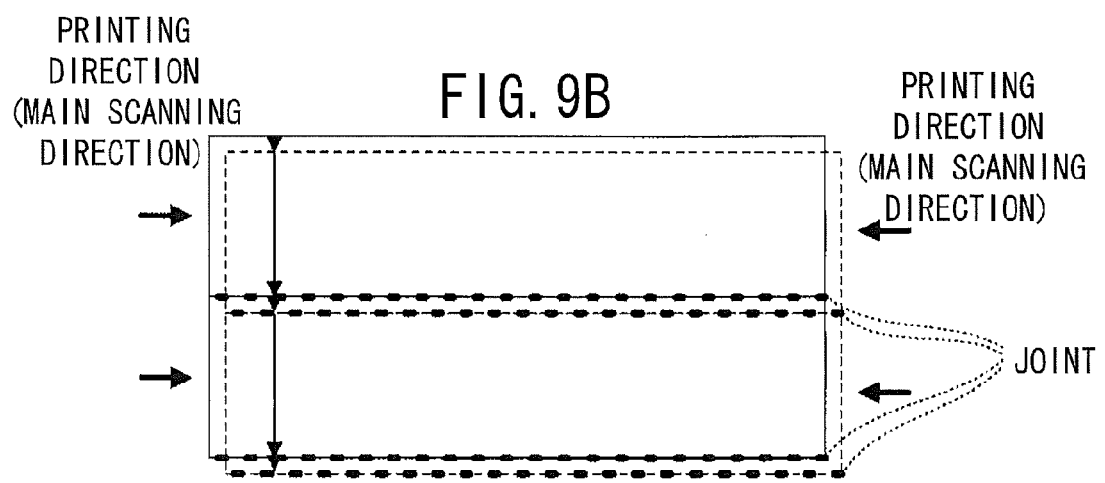
FIG. 9B is an explanatory diagram illustrating streak generated by two pass printing in which a paper conveyance amount is uneven.

(3) In the above respective embodiments, a description has been made assuming that the one-pass printing in which the streak is particularly easily generated is adopted. However, the above ink amount adjustment process is effective also for multi-pass printing in which the paper sheet is conveyed by a distance smaller than the nozzle width per a single main scanning (one pass) of the print head 27 and thus printing of an image having a predetermined area is completed by a plurality of main scans (multi pass). For example, as illustrated in FIG. 9A, the streak may be generated in the joint between two adjacent bands also in two-pass printing. Further, as in the case of FIG. 9A in which the paper conveyance amount in the sub-scanning direction is even (same length), the streak may be generated even in the case illustrated in FIG. 9B where the paper conveyance amount in the sub-scanning direction is uneven. In these cases shown in FIGS. 9A and 9B, the ink amount adjustment process is performed on line image data that is corresponding to an upstream line in a sub-scanning direction of an adjacent line to be printed in a next pass, for example. Although the print direction is changed alternately in the examples of FIGS. 9A and 9B, the same can be said for a case where the print direction is not changed. Incidentally, although the band areas are displaced from each other in horizontal direction in these drawings so as to make a difference between the passes easier to understand, actual horizontal positions of the band areas coincide with each other.

(4) Although the ink amount adjustment process that reduces the ink amount used for printing of the rear edge raster of the band is exemplified in the above respective embodiments, the invention is not limited to this. For example, instead of or together with the rear edge raster of the band, the front edge raster of the band (raster at the edge of a first band on the side adjacent to a second band to be printed earlier than the first band) may undergo an ink amount reduction. Further, the ink amount adjustment process may be performed not only for image data corresponding to one line but also for image data corresponding to a plurality of lines. However, when the ink amount adjustment process is performed only for image data corresponding to one line as in the above embodiments, the adjustment can be achieved in a shorter time than in the case where the ink amount adjustment process is performed for image data corresponding to a plurality of lines.

(5) In the above respective embodiments, the printer 2 that can express four gradation levels is exemplified. Instead, a printer that can express, e.g., three gradation levels or five or more gradation levels may be used.

(6) Although the ink amount adjustment process is executed on the personal computer 1 side in the above respective embodiments, the invention is not limited to this, but the ink amount adjustment process may be executed on the printer 2 side. In this case, the print data supply process (S15) is a process to supply the adjusted print data generated in the printer 2 to the print execution section 26.

Figure 3:
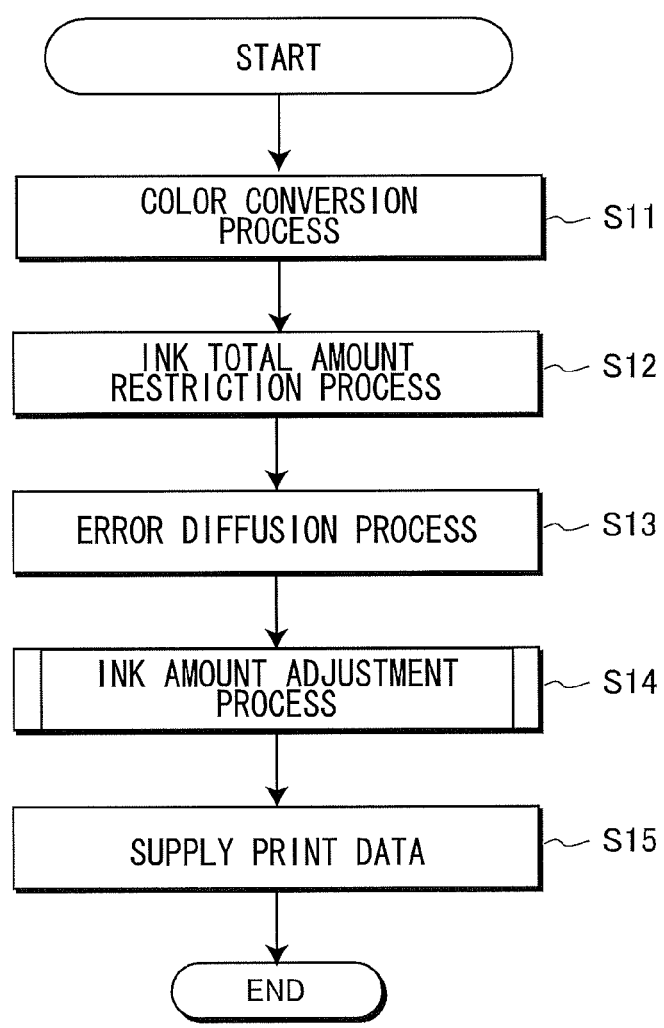
FIG. 3 is a flowchart illustrating a process executed by a personal computer as a function of a printer driver.

(7) At least part of processes shown in FIGS. 3, 4, and 8 may be performed a specific hardware, such as ASIC.

What is claimed is:

1. An image processing apparatus comprising:
a processor configured to function as:
a generating unit configured to generate print data indicating whether a dot having one of a plurality of sizes is formed or not, by performing a halftone process on original image data, wherein the print data includes partial data for printing in a unit region on a recording sheet, wherein the unit region is a region to be printed during one main scanning, which is a movement of a print head in a main scanning direction, and wherein the partial data includes edge part data for printing in an edge region of the unit region;
a correcting unit configured to generate corrected print data by correcting the print data, the correcting unit including:
a dividing unit configured to divide the edge part data into a plurality of block data, each block data including a plurality of dot data corresponding to a plurality of dots to be printed and arranged in the main scanning direction on the recording sheet, and each dot data including size information indicating one of the plurality of sizes;
an index value determining unit configured to determine an index value for each block data, the index value being determined in accordance with an amount of ink to be used for printing all of the plurality of dots corresponding to the plurality of dot data included in the respective block data; and
a changing unit configured to change, for each block data, the size information of at least one of the plurality of dot data included in the respective block data based on the index value such that a first amount of ink is less than a second amount of ink, wherein the first amount of ink is an amount of ink to be used for printing all of the plurality of dots for the respective block data in accordance with the changed size information of the at least one of the plurality of dot data included in the respective block data, and wherein the second amount of ink is an amount of ink that would have been used for printing all of the plurality of dots for the respective block data in accordance with the size information before changing the size information of the at least one of the plurality of dot data included in the respective block data; and
a supplying unit configured to supply the corrected print data,
wherein the changing unit includes:
a first unit configured to change the size information of the at least one of the plurality of dot data in the respective block data from a first size to a second size less than the first size; and
a second unit configured to change the size information of the at least one of the plurality of dot data in the respective block data from the second size to a third size less than the second size,
wherein the first unit is configured to change the size information prior to the second unit.

2. The image processing apparatus according to claim 1, wherein, when the index value indicates that the amount of ink to be used for printing all of the plurality of dots corresponding to the plurality of dot data included in the respective block data is less than a prescribed value, the changing unit does not change the size information,
whereas, when the index value indicates that the amount of ink to be used for printing all of the plurality of dots corresponding to the plurality of dot data included in the respective block data is greater than or equal to the prescribed value, the changing unit changes the size information of the at least one of the plurality of dot data included in the respective block data.

3. The image processing apparatus according to claim 1, wherein, for each block data, the changing unit is configured to set a target ink amount according to the index value and change the size information of the at least one of the plurality of dot data included in the respective block data such that an amount of ink to be used for printing all of the plurality of dots corresponding to the plurality of dot data included in the respective block data based on the corrected print data is equal to the target ink amount; and
wherein the target ink amount is configured to monotonically change according to a change in the amount of ink to be used that is indicated by the index value.

4. The image processing apparatus according to claim 1, wherein the changing unit is configured to not change the size information of one of the plurality of dot data in the respective block data, the size information of the one of the plurality of dot data indicating that the one of the plurality of dot data has the smallest size in all of the plurality of dot data, and
wherein the changing unit is configured to change the size information of the at least one of the plurality of dots having the size information, which indicates that the at least one of the plurality of dots has a first size greater than the smallest size in the respective block data, from the first size to a second size less than the first size and greater than or equal to the smallest size.

5. The image processing apparatus according to claim 1, wherein the edge part data includes edge line data corresponding to one edge line of the edge region in the main scanning direction.

6. The image processing apparatus according to claim 1, wherein the generating unit is configured to generate the print data indicating, for each of a plurality of ink colors, whether a dot having one of the plurality of sizes is formed or not; and
wherein the changing unit is configured to change, based on the index value, the size information of at least one of the plurality of dot data in the respective block data such that a first ratio of a first amount of ink in one ink color to a second amount of ink in the one ink color is identical to a second ratio of a first amount of ink in another ink color to a second amount of ink in the another ink color.

7. The image processing apparatus according to claim 1, wherein the generating unit is configured to generate the print data indicating, for each of a plurality of ink colors of the plurality of dots, whether a dot having one of a plurality of sizes is formed or not, the plurality of ink colors including at least one first color of pigment ink and at least one second color of dye ink; and wherein the changing unit is configured to change the size information based on the index value such that the amount of the ink to be used for printing in the at least one first color remains the same and such that the amount of the ink to be used for printing in the at least one second color is changed.

8. The image processing apparatus according to claim 7, wherein the index value determining unit is configured to determine, for each block data, the index value based on the plurality of dot data in the respective block data;
wherein the changing unit is configured to set a target ink amount according to the index value and determine a ratio of the target ink amount to the index value for each block data; and
wherein the changing unit is configured to change, based on the ratio, the size information of the at least one of the plurality of dot data in each block data such that the amount of the ink to be used for printing in the at least one second color is changed according to the ratio.

9. The image processing apparatus according to claim 7, wherein the index value comprises a second-color index value relating to an amount of ink to be used for printing in the at least one second color;
wherein the changing unit is configured to set, according to the index value, a second-color target ink amount from which the ink amount to be used for printing in the at least one first color is subtracted for each block data and determine a ratio of the second-color target ink amount to the second-color index value for the respective block data; and
wherein the changing unit is configured to change, for each block data, the size information of the at least one of the plurality of dot data included in the respective block data such that the amount of the ink for printing in the at least one second color is changed according to the ratio.

10. The image processing apparatus according to claim 1, wherein each time the unit region is to be printed on the recording sheet by the one main scanning, the recording sheet is moved by the unit region in a sub scanning direction different from the main scanning direction, and
wherein a print operation on the unit region is completed during the one main scanning.

11. A non-transitory computer readable storage medium storing a set of computer-readable instructions installed on and executed by a computer, the computer-readable instructions, when executed by a processor of the computer, instructing the computer to perform processes comprising:
(a) generating print data indicating whether a dot having one of a plurality of sizes is formed or not, by performing a halftone process on original image data, wherein the print data include partial data for printing in a unit region on a recording sheet, wherein the unit region is a region to be printed during one main scanning, which is a movement of a print head in a main scanning direction, and wherein the partial data includes edge part data for printing in an edge region of the unit region;
(b) generating corrected print data by correcting the print data, the generating including:
(b1) dividing the edge part data into a plurality of block data, each block data including a plurality of dot data corresponding to a plurality of dots to be printed and arranged in the main scanning direction on the recording sheet, and each dot data including size information indicating one of the plurality of sizes;
(b2) determining an index value for each block data, the index value being determined in accordance with an amount of ink to be used for printing all of the plurality of dots corresponding to the plurality of dot data included in the respective block data; and (b3) changing, for each block data, the size information of at least one of the plurality of dot data included in the respective block data based on the index value such that a first amount of ink is less than a second amount of ink, wherein the first amount of ink is an amount of ink to be used for printing all of the plurality of dots for the respective block data in accordance with the changed size information of the at least one of the plurality of dot data included in the respective block data, and wherein the second amount of ink is an amount of ink that would have been used for printing all of the plurality of dots for the respective block data in accordance with the size information before changing the size information of the at least one of the plurality of dot data included in the respective block data; and (c) supplying the corrected print data, wherein (b3) changing includes:

(b3i) changing the size information of the at least one of the plurality of dot data in the respective block data from a first size to a second size less than the first size; and (b3ii) changing the size information of the at least one of the plurality of dot data in the respective block data from the second size to a third size less than the second size, wherein (b3i) changing the size information from the first size to the second size is performed prior to (b3ii) changing the size information from the second size to the third size.

* * * * *